United States Patent Office.

ARTHUR SAUER, GUSTAVE SAUER, AND LÉONCE CACHAL, OF PARIS, FRANCE.

Letters Patent No. 106,213, dated August 9, 1870.

IMPROVED LIQUID FOR RAISING PASTE OR DOUGH.

The Schedule referred to in these Letters Patent and making part of the same.

We, ARTHUR SAUER, GUSTAVE SAUER, and LÉONCE CACHAL, all of Paris, in the Empire of France, have jointly invented "a Liquid for Raising Paste or Dough," of which the following is a specification.

The matters employed in the composition of the liquid are in two hundred parts, in the following proportions, viz:

Seventeen parts of a liquid resulting from the distillation of ordinary yeast.

Two parts of a solution of an alkaline salt at five Beaumé.

Eleven parts of a solution of dextrine of "*Frumentum triticum.*"

Seventeen parts of a leguminous solution of "*Verus astralagus.*"

Six parts of a solution of hordein.

Eight parts of a solution of zein.

Eleven parts of a solution of gum, giving, when dried at 100°, the chemical formula of $C^{12} H^{11} O^{11}$, and at 130°, in vacuo, giving the formula $C^{12} H^{10} O^{10}$.

Eleven parts of a solution of flour, obtained by washing the powder of the root of the "*Jatropha manihot*" of Linnæus or other kind of Euphorbia.

Seven parts of an extract of cartilage, by clear boiling water.

One hundred and ten parts of ordinary pure water. Total, two hundred parts.

This liquid is clarified with albumen and bottled. When required for use it is put in the hot or tepid water employed in making paste or dough.

Claim.

We claim as our joint invention—

The composition of a liquid for raising paste or dough, composed of a certain number of parts of the several ingredients herein described.

ARTHUR SAUER.
GUSTAVE SAUER.
LÉONCE CACHAL.

Witnesses:
   A. BLÉTUS,
   J. U. ZUST.